H. L. KINCAID.
HEADLIGHT CUT-OUT.
APPLICATION FILED JULY 28, 1917.

1,283,801.

Patented Nov. 5, 1918.

H. L. Kincaid
Inventor

Witnesses by

Attorneys

UNITED STATES PATENT OFFICE.

HORACE L. KINCAID, OF ATHENS, ALABAMA.

HEADLIGHT CUT-OUT.

1,283,801.

Specification of Letters Patent.

Patented Nov. 5, 1918.

Application filed July 28, 1917. Serial No. 183,370.

*To all whom it may concern:*

Be it known that I, HORACE L. KINCAID, a citizen of the United States, residing at Athens, in the county of Limestone and State of Alabama, have invented a new and useful Headlight Cut-Out, of which the following is a specification.

The present invention relates to a device for use upon automobiles having electric lamps supplied in series with electrical energy derived from a magneto or generator driven by the engine which operates the automobile, and it is the object of the invention to provide a device operable for cutting or shunting out one of the lamps when the throttle valve is moved to slow down the engine, thus removing one lamp from the circuit in order that the other lamp will be supplied with sufficient energy to keep a bright light. The device is intended for use with the head lights of the automobile in order that when the engine is slowed down, only one head light will be supplied with electrical energy, to provide sufficient light ahead, it being ordinarily the case that the lights will be exceedingly dim when the engine is retarded.

The invention has for its object a provision of a device of the nature indicated which is extremely simple and inexpensive in construction, which will be thoroughly practical and effective in use and which can be readily applied or installed to perform its office satisfactorily.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1:
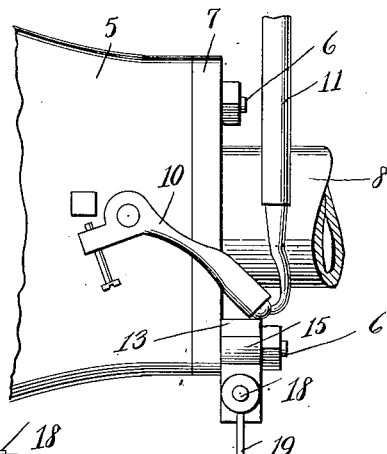
Figure 1 is a fragmental plan view of the device as applied to the carbureter of an automobile engine.
Figure 2:
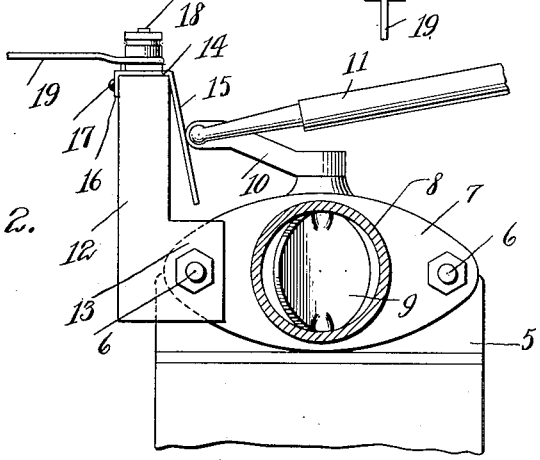
Fig. 2 is an elevation thereof.
Figure 3:
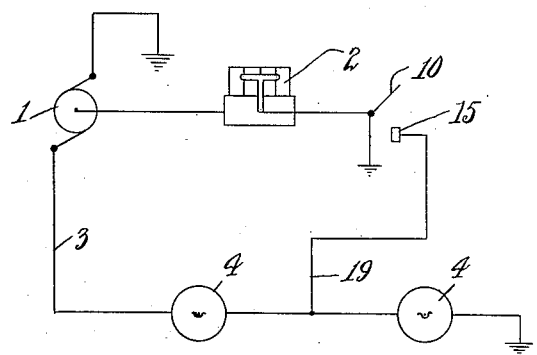
Fig. 3 is a diagrammatical view showing the device as connected to the electrical circuit.

As shown in diagram in Fig. 3, certain makes of automobiles, are provided with a magneto or electrical generator 1 driven by the engine 2, and supplying electrical energy in a translating circuit 3 having the electrical lamps or head lights 4 therein in series, part of said circuit including the frame to which the generator 1 and one lamp 4 are grounded. It will be apparent that the amount of electrical energy supplied by the generator 1 will be proportional to the speed of rotation of the engine, so that when the engine is running slowly, the electrical current will be weak, therefore dimming the lights which is objectionable.

The numeral 5 designates generally, the carbureter of the engine 2, which has its delivery portion fastened by bolts 6 to the flange 7 at the receiving end of the intake manifold 8 which supplies the carbureted air, to the engine. The throttle valve 9 controls the flow of carbureted air to the engine, therefore controlling the speed, the speed being retarded as the throttle valve is moved to closed position. This throttle valve has the usual throttle lever 10 operated by a rod or link 11 connected thereto.

In carrying out the invention, there is provided a post 12 of insulating material provided at its lower end with an apertured ear 13 extending from one side to engage one of the bolts 6 and to be clamped thereby against the flange 7 to support the post in the desired position at one side of the throttle lever 10 which is grounded to the frame of the automobile due to the contact of the metallic parts. A metallic piece or strip 14 seats upon the upper end of the post 12 and is provided with a depending spring terminal or release spring 15 overhanging the ear 13 and under tension to spring away from the post, the recess between the ear 13 and post 12 accommodating said leaf spring 15 to permit it to flex back and forth to and from the post. This leaf spring 15 provides a spring contact. The piece 14 is provided at that side of the post 12 opposite to the spring contact 15 with a depending terminal 16 fastened, as at 17, in any suitable manner to the post, and the piece 14 has an upstanding binding post 18 to which is secured a conductor 19 and this conductor 19 is connected to the conductor of the circuit 3 between the lamps 4.

In practice, when the post 12 is applied to the carbureter, it is adjusted to such a position that when the throttle valve is nearly closed, the throttle lever 10 will contact with the spring contact 15, and the corresponding bolt 6 is then tightened to hold the post 12 firmly in place. When the throttle valve is opened to speed up the engine, the throttle lever 10 will be moved away from the contact 15, as seen in Fig. 3, but when the throttle valve is moved to closed position, the throttle lever 10 in engaging the spring contact 15 will cut out the right hand lamp 4 in Fig. 3, there being a short circuit established by the conductor 19, spring contact 15, throttle lever 10 and metallic parts leading to the frame. The electrical energy will therefore only flow through the left hand lamp, to keep it fully lighted when the engine is running slowly. The spring contact is sufficiently resilient to permit it to yield if the throttle is completely closed, the throttle lever engaging said spring contact before the throttle valve reaches its completely closed position. As soon as the throttle valve is opened, the throttle lever in being moved away from the spring contact 15 will open the shunt, thereby compelling the electrical energy to flow through both lamps which will now be supplied with sufficient electrical current to light them both.

Having thus described the invention what is claimed as new is:

1. A cut-out embodying, in combination with a throttle valve including a valve lever, and means for rocking the lever, a post supported adjacent the throttle valve and insulated therefrom, and a resilient contact strip secured to the upper end of the post and depending therefrom, said strip tensioned to spring outwardly from the post and in position to be contacted by the lever when rocked to one position.

2. A cut-out embodying, in combination with a throttle valve including a valve lever, and means for rocking the lever, a post supported adjacent the valve and insulated therefrom, a metallic strip seated upon the upper end of the post and secured thereto, and a depending spring terminal secured to the strip and under tension to spring away from the post to flex back and forth to and from the post, and in position to be contacted by the end of the lever when swung to one position.

In testimony that I claim the foregoing as my own I have hereto affixed my signature in the presence of two witnesses.

HORACE L. KINCAID.

Witnesses:
 HOWARD T. CARRELL,
 THOS. H. HELTON.